United States Patent [19]

Naccache et al.

[11] Patent Number: 5,434,917
[45] Date of Patent: Jul. 18, 1995

[54] UNFORGEABLE IDENTIFICATION DEVICE, IDENTIFICATION DEVICE READER AND METHOD OF IDENTIFICATION

[75] Inventors: David Naccache, Maison-Alfort; Patrice Fremanteau, Strasbourg, both of France

[73] Assignee: Thomson Consumer Electronics S.A., Courbevoie, France

[21] Appl. No.: 135,493

[22] Filed: Oct. 13, 1993

[51] Int. Cl.⁶ .................... H04L 9/00; H04L 9/30; G06K 7/01; G06K 19/00
[52] U.S. Cl. ...................... 380/23; 380/24; 380/25; 380/30; 235/379; 235/380; 235/435; 235/436; 235/439; 235/449; 235/493
[58] Field of Search ............ 380/3, 4, 23, 24, 25, 380/30, 49, 50; 235/379, 380, 435, 436, 439–441, 449, 493; 340/825.31, 825.34

[56] References Cited

U.S. PATENT DOCUMENTS

| | | | |
|---|---|---|---|
| 4,094,462 | 6/1978 | Moschner | 235/419 |
| 4,138,057 | 2/1979 | Atalla | 235/380 |
| 4,138,058 | 2/1979 | Atalla | 235/380 |
| 4,527,051 | 7/1985 | Stenzel | 235/380 |
| 4,783,823 | 11/1988 | Tasaki et al. | 235/380 X |
| 4,926,031 | 5/1990 | Stenzel | 235/380 |

FOREIGN PATENT DOCUMENTS

| | | | |
|---|---|---|---|
| 0161181A1 | 11/1985 | European Pat. Off. | G07F 7/08 |
| 0252499A3 | 1/1988 | European Pat. Off. | G07F 7/10 |
| 0298156A2 | 1/1989 | European Pat. Off. | G06K 19/08 |
| 0451024A1 | 10/1991 | European Pat. Off. | G06K 19/08 |

*Primary Examiner*—Bernarr E. Gregory
*Attorney, Agent, or Firm*—Spencer, Frank & Schneider

[57] ABSTRACT

Memory cards are cheap and contain memory means, but can be forged and duplicated easily. Smart-cards contain also a microprocessor and can be used for cryptographic purposes, but are much more expensive. The plastic support of the card contains randomly distributed ferrite particles (eg. small steel marbles, introduced into the plastic paste during the melting process). This random distribution of the particles is assumed to be impossible to control or influence during the process of fabrication. For personalizing a card, the issuing authority scans the plastic support of the card with a magnetic inductance detector, thereby reading the emplacement of the ferrite particles as a number p. Then the authority computes $s = SIG(ID,p)$, where "SIG" denotes any secure public-key digital signature algorithm and ID the identification details of the card's owner. Finally, s and ID are recorded in the memory means of the card. When such a card is inserted into a reader, the reader scans the plastic part of the card and reads the distribution characteristics as a number p. Then ID and s are retrieved from the card's memory means and the reader checks that s is the valid signature of $\{ID,p\}$.

14 Claims, 2 Drawing Sheets

FIG. 1a
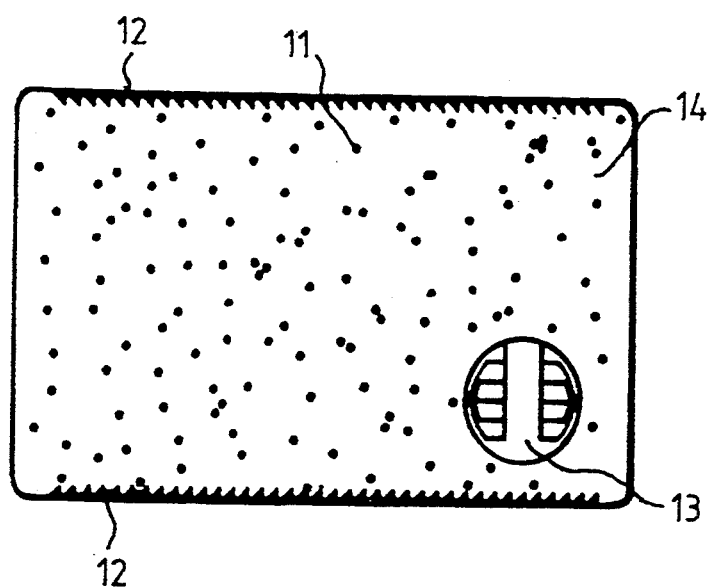
FIG.1

UNFORGEABLE IDENTIFICATION DEVICE, IDENTIFICATION DEVICE READER AND METHOD OF IDENTIFICATION

BACKGROUND OF THE INVENTION

The present invention relates to an unforgeable identification device, identification device reader and to a method of identification.

Different kinds of plastic cards are known. Memory cards are cheap and contain memory means, but can be forged and duplicated easily. Smart-cards contain also a microprocessor and can be used for cryptographic purposes, e.g. in pay TV applications and banking, but are much more expensive.

SUMMARY OF THE INVENTION

It is one object of the invention to provide a cheap and unforgeable memory card. This object is reached by an identification device having an identification region, a plurality of randomly distributed detectable particles contained within the identification region, and memory means for storing an identity data and data from the function set comprising a public-key digital signature scheme based on the identity data and a distribution value of the particles.

The inventive memory card is characterized in that once issued by an authority, the card is nearly impossible to copy and duplicate. This new memory card has significant cost advantages over microprocessor-based smart-cards since memory protection means and computation capabilities are not needed for achieving authentication.

The process of fabrication of the new cards differs from that of standard cards in that small metal or ferrite particles (eg. steel marbles) are mixed with the plastic paste from which the plastic support of the card is to be produced.

Each resulting card will therefore contain a different random distribution pattern of particles. This random distribution of the particles is assumed to be impossible to control or influence during the process of fabrication.

A respective reader is provided with magnetic inductance detectors (reader) that read the distribution of particles as a number p, and with a chip reader for reading the card's memory means.

In order to personalize a card, the issuing authority does the following:
1. Establish the identity details ID of the card's owner;
2. Pick a card and read it's random pattern p;
3. Compute s = SIG(ID,p);
4. Record s and ID in the memory means of the card;
5. Give the card to the user.

Here "SIG" stands for any secure, public key digital signature scheme. The memory means are preferably electronically protected.

When a memory card is inserted into a verification reader, the reader will scan it and convert the random distribution of particles into the number p. Next, the verification reader will read s and ID from the card's memory means and will check that s is actually the signature of {ID,p} by performing $SIG^{-1}$.

In principle the inventive unforgeable identification device includes memory means and an area in which elements, the location of which is detectable, have a random distribution which can be represented by a value p, whereby the location of the elements cannot be controlled under production of the device but can be detected and evaluated in reader means and whereby at least identity data ID and data s of a public-key digital signature scheme s = SIG(ID, p) are stored in the memory means.

It is a further object of the invention to provide a reader for this identification device.

In principle, the inventive identification device reader includes detector means—especially a magnetic inductance reader—for detecting the location of the elements from which the distribution value p is generated, and reading means for reading at least the identity data ID and data s stored in the memory means of the identification device.

A respective identification system is disclosed in claim 9.

It is a further object of the invention to disclose a method of identification which utilizes the inventive identification device and reader.

In principle the inventive method uses the identification device and the identification device reader and includes the following issuing steps:
collecting identity details ID of a user;
computing s = SIG(ID, p), where SIG is a public-key digital signature scheme function;
storing s and ID in the memory means of the identification device, and includes the following identification steps:
reading the identification device by the identification device reader, whereby the distribution value p is generated and at least s and ID are read from the memory means;
checking that s is actually the signature of (ID, p) by performing the respective inverse public-key digital signature scheme function $SIG^{-1}$.

BRIEF DESCRIPTION OF THE DRAWINGS

Preferred embodiments of the invention are described with reference to the accompanying drawings, which show in:

FIGS. 1 and 1a. structure of an inventive memory card;

FIGS. 2 and 2a structure of an inventive reader for the memory card.

DESCRIPTION OF THE PREFERRED EMBODIMENTS

In FIGS. 1 and 1a, buried ferrite particles 11 are distributed within the plastic support 14 of a memory card having a standardized shape. This card contains a chip 13 with which data can be exchanged in a respective reader, e.g. a contactless reader. At two sides of the card, electronic scanner synchronisation marks 12 are arranged.

Figure 2:
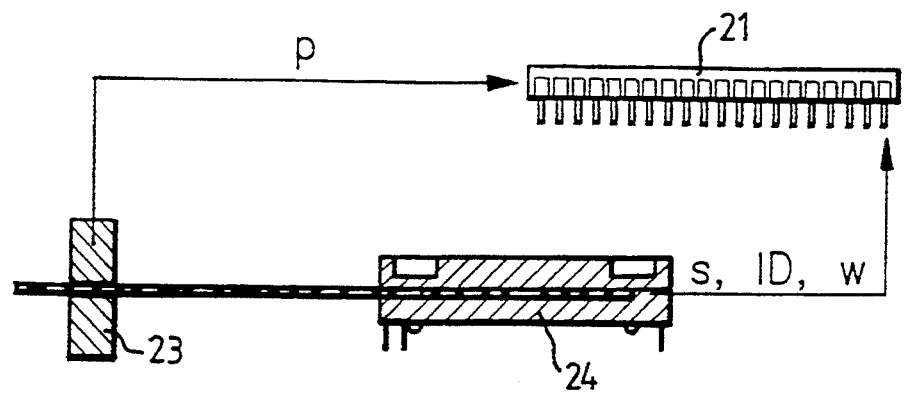
Figure 2:
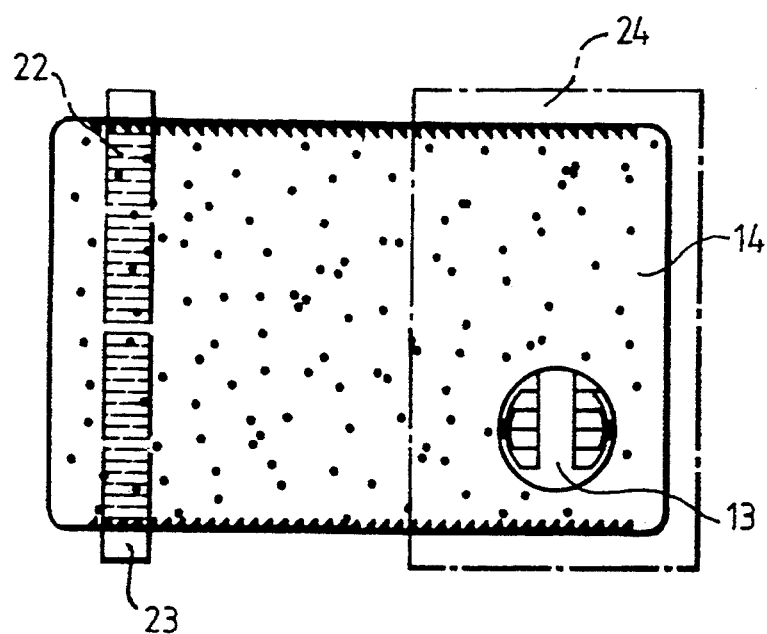

In FIGS. 2 and 2a, the card is inserted in a reader (scanner). The reader includes electromagnetic scanning cells 22 for generating the distribution value p, an optical scanning synchronization head 23, and reading means (smart-card chip reader) 24 for reading at least the identity data ID and data s stored in the memory of the chip 13. ID, s, the distribution value p and possibly the password w are evaluated in a microprocessor 21 which can be a part of the reader device.

One example of digital signature schemes is Rabin's signature scheme where n is an RSA modulus and s is defined by $s = SIG(m) = m^{\frac{1}{2}} \mod n$. The corresponding verification is done by checking that $s^2 \mod n = m$.

Optionally, one can improve the basic scheme by including also a user's password w. In such a case, the process of issuing a card and verifying it's validity becomes:

1. Establish the identity details ID of the card's owner.
2. Pick a card and read it's random pattern p.
3. Decide a password w specific to the user.
4. Compute s=SIG(ID,p,w)
5. Record s and ID in the memory means of the card.
6. Give the card and w to the user.

For verifying the validity of this card, the verification reader will proceed as before but will request the user to key-in W.

The SIG scheme can be one of the following or respective methods:

Rabin's digital signature;
RSA algorithm, Rivest Shamir, Adelman, "A method for obtaining digital signatures and public-key cryptosystems", Communications of the ACM, Vol 21, No 2, pp 120–126, 1978);
Data Signature Standard (DSS);
El Gamal, "A public-key cryptosystem and a signature scheme based on the discrete logarithm", IEEE Transactions on Information Theory, vol. 31, No. 4, pp. 469–472, 1985;
Fiat, Feige and Shamir, "Zero-Knowledge Proofs of Identity", Journal of Cryptology, vol 1, pp. 77–94. See also EP-A-0252499 and EP-A-0325238.

For synchronizing the scanning of the ferrite particles (whatever the insertion speed of the card is), the card can be marked, e.g. at the boundaries, by a sequence of mechanical (embossed or holes) or optical marks. The marks are preferably detected optically by the reader and trigger the scanning of plastic, band by band. The marks can also be based on electromagnetic detection techniques and the triggering of the scanning is done accordingly.

Instead of plastic material any other material can be used which allows detection of the distribution of the particles. Instead of magnetic particles, other kinds of elements can also be used, the distribution of which can be detected and which do not allow copying.

Instead of a card, any other kind of device or shape can be used, whereby the reader is adapted respectively.

Identification shall also mean authentication.

We claim:

1. An identification device, comprising:
    a support member;
    detectable particles having a random distribution within a region of said support member, the random distribution of the detectable particles being represented by a value p corresponding to the random distribution, which value p can be detected by an identification reader; and
    memory means supported by said support member for storing an identity data ID and data s corresponding to a public-key digital signature scheme based on a function of the identity data ID and the value p.

2. An identification device as defined in claim 1, wherein said support member comprises plastic, and said detectable particles comprise magnetic particles.

3. An identification device as defined in claim 2, wherein said magnetic particles comprise one of steel and ferrite pellets.

4. An identification device as defined in claim 1, wherein said memory means are electronically protected.

5. An identification as defined in claim 1, wherein said support member includes scanning marks for scanning control.

6. An identification device as defined in claim 1, wherein said support member comprises a standardized memory card.

7. An identification reader for an identification device, the identification device including: a support member; detectable particles having a random distribution within a region of the support member, the random distribution of the detectable particles being represented by a value p corresponding to the random distribution, which value p can be detected by the identification reader; and memory means supported by the support member for storing an identity data ID and data s corresponding to a public-key digital signature scheme based on a function of the identity data ID and the value p, said identification reader comprising:
    detector means for detecting the particles in the support member and producing the value p corresponding to the random distribution of the particles; and reading means for reading the ID data and the data s stored in the memory means of the identification device.

8. An identification reader as defined in claim 7, wherein the particles of the identification device comprise magnetic particles and the detector means comprises a magnetic inductance reader for detecting the magnetic particles.

9. An identification reader as defined in claim 7, wherein the support member of the identification device includes scanning marks for scanning control and said identification reader further comprises evaluating means for evaluating the scanning marks of the identification device.

10. An identification reader as defined in claim 7, said identification reader further comprising computing means coupled to the detecting means and the reading means for evaluating the ID data, the s data and the distribution value p of the particles.

11. An identification reader according to the 7 forming a combination with said identification device.

12. A method of identification which utilizes the combination according to claim 11, comprising:
    performing issuing steps, including:
        collecting identity data ID from a user;
        computing the data s corresponding to the public-key digital signature scheme based on the identity data ID and the distribution value p of the particles; and
        storing the data ID from said collecting step and the data s from said computing step in the memory means; and
    performing identification steps, including:
        reading the identification device using the identification reader to read the data ID and the data s from the memory means of the identification device;
        detecting the particles in the support member of the identification device and producing the value p corresponding to the random distribution of the particles in the support member of the identification device; and
        verifying that the data s in said reading step is an actual digital signature of the data ID and distribution value p concatenated from said computing step by performing an inverse public-key digital signature scheme function.

13. A method as defined in claim 12, wherein said computing step includes computing the data s corresponding to a public-key digital signature scheme based on a password w in addition to being based on the identity data ID and the value p, wherein the password w is user specific; and said identification steps further comprise the step of a user entering the password w; and wherein said verifying step includes checking that the data s read in said reading step corresponds with an actual digital signature of the identity data ID, password w and distribution value p concatenated from said computing step.

14. A method as defined in claim 12, wherein the identification device includes scanning control marks, and said reading step is synchronized using said scanning control marks.

* * * * *